United States Patent [19]
Litchford et al.

[11] Patent Number: 5,196,856
[45] Date of Patent: Mar. 23, 1993

[54] PASSIVE SSR SYSTEM UTILIZING P3 AND P2 PULSES FOR SYNCHRONIZING MEASUREMENTS OF TOA DATA

[75] Inventors: George B. Litchford, Northport; Burton L. Hulland, Long Beach, both of N.Y.

[73] Assignee: Litchstreet Co., Northport, N.Y.

[21] Appl. No.: 908,183

[22] Filed: Jul. 1, 1992

[51] Int. Cl.⁵ ............................................. G01S 3/02
[52] U.S. Cl. ................................... 342/455; 342/398; 342/32
[58] Field of Search ................... 342/455, 453, 398, 32

[56] References Cited
U.S. PATENT DOCUMENTS
4,733,241 3/1988 Litchford et al. .................... 342/453

Primary Examiner—Theodore M. Blum
Attorney, Agent, or Firm—Brumbaugh, Graves, Donohue & Raymond

[57] ABSTRACT

The range from which a collision avoidance system at an Own station can receive SSR interrogations and reply messages from Other stations, is extended by utilizing P2 pulses for timing TOA measurement in the event P1-P3 pulse pairs are unavailable from the scanning main beam or its side lobes. The amplitude of the P2 pulses in the SLS radiation pattern being greater than the P1-P3 side lobes of the main beam over an angular sector of about 60° centered on the main beam can insure reception of P2 pulses at much greater ranges than P3 pulses contained in the main beam side lobes can be reliably received. Using P2 timing, interlaced Mode A and Mode C reply messages contained in a main beam burst reply sequence are separated into two "families" of TOAs, the Mode C (altitude) TOAs always being longer than the Mode A TOAs by 13 μsec. A "true" TOA is obtained by subtracting an appropriate time period from the TOA of each family, from which identity, altitude and range information is readily derived. The system continuously adapts to the best instantaneously available timing pulses, alternating between P3 timing and P2 timing throughout the time it takes for a main beam rotation of the received SSRs, thereby extending the operation area of multiple TOA measurements from multiple SSRs which, in turn, provides added safety and reduced false alarms compared to prior passive collision avoidance systems.

12 Claims, 5 Drawing Sheets

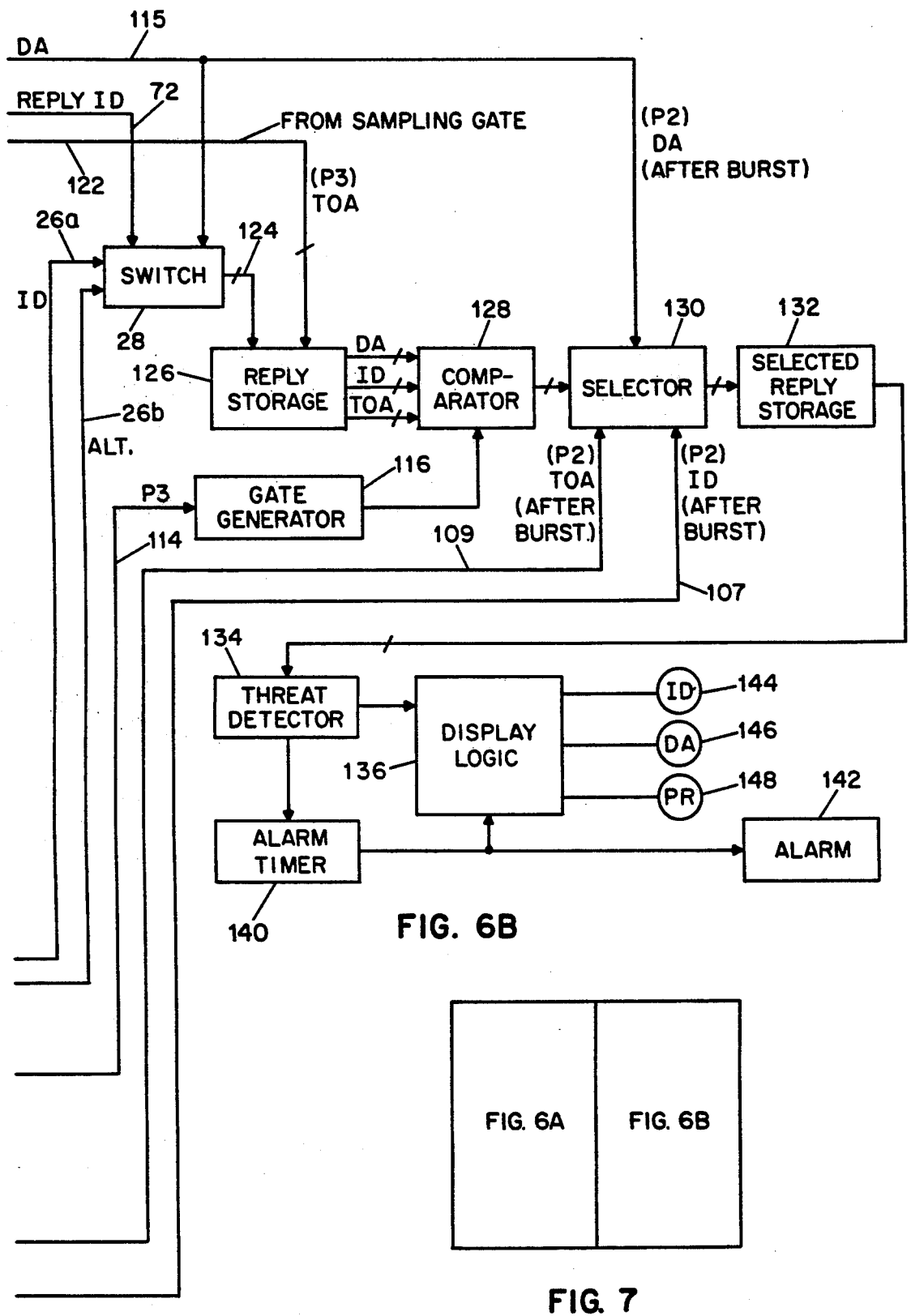

PASSIVE SSR SYSTEM UTILIZING P3 AND P2 PULSES FOR SYNCHRONIZING MEASUREMENTS OF TOA DATA

BACKGROUND OF THE INVENTION

This invention relates generally to passive air traffic control and collision warning systems which utilize interrogation signals transmitted from a ground SSR station and associated transponder reply messages transmitted by vehicles, such as aircraft, that are elicited by the SSR, for determining the ranges, azimuth angles, altitude and identity of one vehicle relative to another or to the ground station and, more particularly, is concerned with improvements to systems of this type, specifically the collision avoidance system described in applicants, U.S. Pat. No. 4,486,755.

The system shown in U.S. Pat. No. 4,486,755, the disclosure of which is hereby incorporated herein by reference, receives standardized interrogation signals, having the waveforms shown in FIG. 1, transmitted from a ground station at a frequency of 1030 MHz on a narrow rotating main beam and in the side lobes of the main beam. The standardized interrogation signal consists of three pulses each 0.8 $\mu$sec. wide: a P1 pulse; a P2 pulse spaced 2.0 $\mu$sec. from the P1 pulse; and a P3 pulse spaced from P1 by either 8.0 $\mu$sec or 21.0 $\mu$sec. The P1 and P3 pulses are transmitted by the main beam and also, unintentionally, by the main beam side lobes which, unless suppressed, may be sufficiently strong to interrogate nearby transponders, creating false replies. Referring to FIG. 2, the rotating directional antenna that has been employed over the past several years, many of which likely will still be in service for many years to come, produces a scanning beam 10 which is about 2.5° to 3.0° wide at its 3dB point and slightly wider at its suppression control point.

In most SSRs, a second, static antenna omnidirectionally broadcasts a side lobe suppression control pattern 12 containing P2-only pulses or P1-P2 pulse pairs, wherein the P2 pulse is synchronized with the P1 pulse in the main beam, at a significantly higher level than the main beam side lobes, the purpose of which is to prevent transponder replies to other than main beam interrogation pulses when such main beam pulses exceed the P2 pulse suppression signal level by a fixed amount. On some SSR control patterns only P2 pulses are transmitted, which combine with the P1 pulses of stronger main beam side lobes to create a P1-P2 suppression pair. More specifically, the radiated amplitude of P2 at the transponder is (1) equal to or greater than the signal amplitude of P1 from the greatest side lobe transmission of the antenna radiating P1 (i.e., the rotating main beam 10) and (2) at a level lower than 9dB below the radiated amplitude of P1 within the desired arc of interrogation. When main beam P1 pulse levels exceed P2 pulse levels, P3 is no longer suppressed and P1-P3 pulse pairs interrogate transponders that are in the main beam.

A P1-P3 pulse pair with a separation of 8.0 $\mu$sec. between P1 and P3 transmitted on the main beam interrogates the identity (Mode A) of a transponder-equipped aircraft, and a separation of 21.0 $\mu$sec. between P1 and P3 interrogates that aircraft's altitude (Mode C). A series of about twenty such P1-P3 pulse pairs, one-half of which typically are Mode A interrogations and the other half Mode C interrogations, is received at a transponder, within a beam's width, during each 360 degree scan of the rotating beam. During the period that the rotating beam is pointing at the transponder, that is, the time the beam takes to scan approximately 4°, known as the "beam-dwell" time, the transponder replies in accordance with the "un-suppressed" P1-P3 spacings of the interrogation message. Interlaced Mode A and Mode C interrogation messages, such as ACACAC, or AACAAC, are separated by intervals typically of about 2500 $\mu$sec. but in the range between a minimum of about 2,000 $\mu$sec. to a maximum of approximately 5,000 $\mu$sec. The broad SLS pattern, being significantly stronger at all azimuths outside of the main beam skirt (approximately 14-16 dB down from the main beam peak), prevents interrogation pulse pairs from being received by a transponder unless they are in the sector defined by the 3°-4° width of the main beam.

Summarizing, a P1-P3 pulse pair transmitted on the SSR main beam will interrogate an airborne transponder, causing it to transmit mode A and mode C messages, only if the amplitude of the P1-P3 pulses received at the transponder exceeds the amplitude of any received associated P2 pulses. Each qualifying transponder within the 360° scanning coverage of the SSR main beam transmits in response a reply message on a 1090 MHz radio frequency carrier back to the SSR, with a known delay, so that the reply message is propagated along the path of the main beam and thus its signal strength is increased by beam gain, and received by a 1090 MHz receiver at the SSR. Each such 1090 MHz transponder transmission, known as a "reply message" and depicted in FIG. 3, includes a pair of framing pulses F1 and F2 separated by 20.3 $\mu$sec. which define the start and stop, respectively, of the message, between which thirteen information pulses (twelve of which are currently used) are spaced in increments of 1.45 $\mu$sec. from the first framing pulse, each of which is 0.45 $\mu$sec. wide and may or may not be present depending upon the content of the message transmitted in reply to the 1030 MHz interrogation signal. The format of the message contained between framing pulses F1 and F2 is similar for any one of 4,096 identity codes transmitted. The absence or presence of each of twelve information pulses establishes which code is transmitted on 1090 MHz in response to the reception of an interrogating P1-P3 pulse pair spaced by 8.0 $\mu$sec.

Similarly, the format of the message contained between the framing pulses is the same for any one of the altitude codes, which do not use $D_1$ pulses, each of which represents the altitude of the aircraft to within $\pm 50$ feet in 100-foot increments up to a maximum in excess of 125,000 feet. Thus, the structure of the reply message allows for the possibility of 4,096 different code groups, each representing one or more pieces of information such as identity or altitude of the responding aircraft. As previously mentioned, 1030 MHz P1 and P3 interrogation pulses separated by 8.0 $\mu$sec. when decoded elicit a reply code group transmitted on 1090 MHz representing identity. Similarly, a P1-P3 spacing of 21.0 $\mu$sec. elicits a reply code representing the altitude of a given aircraft. As assigned by ATC or other authorities such as the military, the identity code is set in by the pilot with a cockpit "digit switch", while the altitude code is automatically established by a barometric altimeter and an associated encoder. The identity code designations consist of four digits, each of which lies between 0 and 7, inclusive, and is determined by the sum of the pulse subscripts given in FIG. 3. The identity code of the aircraft may be 1543, for example, which is represented by the presence of $A_1$; $(B_1B_4)$; $C_4$; and $(D_1D_2)$ pulses. The transponder automatically continuously transmits this identity code in response to every received Mode A interrogation regardless of which radar is interrogating, the beam width of the interrogating radar, or whether it is a civil, military or European radar.

In a similar manner, in response to interrogation P1-P3 pulses spaced by 21.0 μsec., the transponder automatically looks at an automatic altitude encoder coupled to the aircraft's own barometric altimeter, which automatically changes the code with changes in altitude according to a pattern prescribed by the U.S. NATIONAL STANDARD FOR THE IFF MARK X (SIF) AIR TRAFFIC CONTROL SYSTEM (Oct. 10, 1968), and the reply message transmitted by the transponder is changed accordingly. Although the altitude information is presented in the same pulse format as the identity information, the ground system readily discriminates between Mode A and Mode C replies to its interrogation, because the relatively long interval between PRPs, and thus between interrogation messages, is such that only during a specific period of, say 3,000 μsec., representing a round trip of about 250 nautical miles (3000/12 μsec. per NM), following an interrogation message wherein the P3 pulse is spaced from P1 by 8.0 μsec., all aircraft that are within the beam and within 250 NM respond with identity codes. Since the ranges of most SSR radars are limited to about 200 miles line-of-sight, all targets reply within typically 2500 to 3000 μsec. During the following PRP, during which, say a Mode C interrogation is transmitted by the SSR, all aircraft out to a similar predetermined range that are intercepted by the main scanning beam will reply only with altitude codes. In this way there is no confusion between identity and altitude replies even though both use identical signal formats, because each pulse has a different significance. These identity and altitude codes are interpreted by an airborne collision warning system in the same way as does the ground station so as to provide collision warning data on all nearby transponders.

In the passive threat warning and collision avoidance system described in the '755 patent, an Own station receives interrogations from at least one and usually multiple SSR's within operating range, not only when the main SSR beam is pointing at it but also when Own station is illuminated by lower level side lobes of one or more main beams, and capitalizes on time of arrival (TOA) data from multiple SSRs to create a small cocoon of airspace that represents the approximate range and near exact altitude of any nearby transponder-equipped aircraft that may be a threat to Own's aircraft. Use of such transponders is mandated in some 240,000 aircraft in the United States alone and about 350,000 worldwide.

During a brief "listen-in" period of about 200 μsec. initiated by Own's reception of a P1-P3 decode, Own station receives replies transmitted by transponders at Other stations in the general vicinity of Own station in response to each interrogation from an SSR. The received replies are decoded and using the P3 time of the associated interrogation message received by the transponder's 1030 MHz receiver, produce time of arrival (TOA) data for all surrounding aircraft and SSR stations within the sensitivity range of the Own station's 1030 MHz and 1090 MHz receivers. Operation of the '755 system depends on the amplitude of the side lobes of the rotating main beam being sufficiently high that a P1-P3 pulse pair would be received via the main beam side lobes so long as that receiver was within a given operating range of an SSR. Thus, the '755 system provides such TOA measurements not only during, but also before and after passage of the main beam, so long as P1-P3 pulse pairs can be received; the rotating main beam may be pointing in a direction other than at Own station and interrogating other transponders. Consequently, it is essential to the operation of the '755 system that it receive P1-P3 pulse pairs, and the associated 1090 MHz responses, both before and after passage of the SSR main beam through Own's station, throughout an angular sector of about ±30° straddling the main beam's axis. The inability to receive P1-P3 pulse pairs in the deep nulls between the many such side lobes limited the effectiveness of the system.

The last decade has witnessed an evolutionary change in the design of ground SSR antennas, in particular the antenna system employed in SSR systems of the type here under discussion. Several hundred U.S.-based SSR's are now or are in the process of being equipped with an improved antenna system which is electrically phased so as to create a narrow, main scanning beam on which P1-P3 interrogation pulses are transmitted and reply messages are received, and which has very low side lobes. The new antennas usually do not include the static stand-alone antenna used in the earlier system for omnidirectionally broadcasting a P1-P2 side lobe suppression pattern, but, instead, employ antenna structure and radiating elements integral and rotatable with the rotating main beam-forming antenna structure for generating an SLS control pattern. As shown in FIG. 4, the SLS control pattern of this new system, containing either P1-P2 pulse pairs or only stand-alone P2 pulses, is generally "egg-shaped" in the horizontal plane, or may have a narrow null along the main beam's axis. The maximum signal of the SLS pattern, and therefore its maximum range of reception, is aligned with the axis of the main beam 16 and rotates with it; thus, the maximum signal level and therefore the range of the rotating SLS pattern traces an imaginary circle 18 as it rotates with the main beam. However, the signal strength is maximum only within a sector approximately ±40° wide which straddles the rotating main beam. The signal level of the SLS control pattern in the direction of the main beam typically is about 14 dB to 16 dB down from the peak amplitude of the main beam and about 20 dB above the average level of the main beam side lobes. The level of the control pattern above the side lobe level varies with the angular displacement from the main beam, as much as 30 dB at an angle of 180° from the main beam, while averaging approximately 20 dB above the main beam side lobes during a rotation period. The new SLS pattern exhibits high signal levels, without deep nulls, at all azimuths, within the ±40° angular sector straddling the main beam, outside of which there is some diminution in level but still greatly exceeding the level of the main beams side lobes.

Unfortunately, however, this recent reduction in level of the main beam's side lobes turns out to be a disadvantage to the '755 system, the operation of which depends on reception of P1-P3 pulse pairs, not only those contained in the main beam but also those transmitted in and between adjacent side lobes. Consequently, the major reduction in side lobe level provided by the improved SSR antenna significantly reduces the operational range of the '755 system and, indirectly, the accuracy of its collision warnings, by reducing the probability of receiving multiple SSR's at most locations. As the population of improved antenna systems becomes larger, the useful collision warning range of '755 systems could be reduced.

Adding to the challenge is the fact that of the approximately 3,000 SSR's currently in service throughout the world, some already are using the improved antenna system, others are in the process of being updated, and others may continue using the "old" system, without change, for many more years. It is projected that there will be a "mix" of old and new antenna systems for approximately ten to twenty years before the "old" antennas are totally phased out.

Thus, there is a current and compelling need for a passive threat warning and collision avoidance system that is adaptable to the radiation characteristics of both the "old" and the "new" SSR antenna systems. The system should also be operable in geographical areas where only the P2 pulse is transmitted in the SLS control pattern, as is the case of SSR's in England and some other European countries. Some U.S. stations such as ASR-9 SSRs may also transmit only P2 pulses on the SLS control pattern.

Accordingly, the primary object of the present invention is to provide an "adaptive" collision avoidance system embodying the principles of the '755 system and capable of operation with any of the three types of ground radar transmission systems described above.

Another object of the invention is to extend the useful range of such system from an SSR thereby to increase the probability that SLS signals from two or more SSRs interrogating nearby targets will be received by the collision avoidance system and thereby significantly reduce false alarms and provide more precise measurement of pseudo-range.

Additionally, the system must be passive (that is, it should not itself transmit for the purpose of detecting a potentially colliding airplane), thus avoiding interference on either the 1030 MHz channel or the 1090 MHz channel of the standardized SSR system.

The system should also be relatively simple and inexpensive to manufacture so as to be economically feasible for owners of light aircraft such as those used in general aviation.

SUMMARY OF THE INVENTION

In accordance with the present invention, which will be described in association with the collision avoidance system shown in U.S. Pat. No. 4,486,755, but the principles of which are also applicable to other PSSR systems such as that disclosed in U.S. Pat. No. 4,115,771. In the event P1-P3 pulse pairs are not available, the system is adapted to use either P1-P2 pulse pairs or "stand-alone" P2 pulses, for timing the "listen-in" period of an Own station. More specifically, in the event of unavailability of P1-P3 pulse pairs, of which P3 is normally used for initiation of time of arrival (TOA) measurements, the system automatically selects, as a second choice, P1-P2 pulse pairs because of their pulse width and unique separation by exactly 2.0 $\mu$sec. and selects, as a third choice, stand-alone P2 pulses, for timing the "listen-in" period. The amplitude of the P2 pulse contained in the SLS radiation pattern of both the "old" and the improved SSR antenna system is greater than the level of the main beam side lobes over an angular range of at least about $\pm 40°$ from the direction of the main beam axis, which insures its reception, before and after passage of the main beam through a transponder, at ranges much greater than the range at which side lobes of the main beam and nulls between them can be reliably received. For example, by quadrupling the reception range in the $\pm 40°$ sector, which is readily possible, by using P2 signal strength versus the much weaker side lobe P3 signal strength and deep nulls between side lobes the useful air-to-air collision protection area surrounding an SSR is increased by a factor of sixteen. This increase would also apply to any adjacent SSR's within Own's operating range, thereby providing large overlapping protection areas.

That P2 time (derived from either the P2 pulse of a P1-P2 pair or a "stand-alone" P2) can be used for synchronizing TOA measurements is based on the different spacings between P2 and P3 pulses in Mode A and the P2-P3 spacing of Mode C interrogation messages, and the fact that Mode A and Mode C reply messages elicited by an interrogating main beam mimic most of the interrogation messages and other characteristics of the beam. From Own's examination of the 1090 MHz "mimic" patterns, it is possible to use P2 time to measure TOA values of reply messages. More particularly, since the spacing between P2 and P3 pulses is exactly 6.0 $\mu$sec. (8 minus 2) for Mode A (identity) and 19.0 $\mu$sec. (21 minus 2) for Mode C (altitude), if P2 pulse time, instead of P3 pulse time, is used to synchronize the start of the "listen-in" period during which the TOA of a Mode A or a Mode C reply message is measured, the TOA can be corrected, if the interrogation mode is known, to a "synthetic" P3 time. However, the time difference between Mode A reply relative to P2 time and a Mode C reply relative to P2 time will always be exactly 13.0 $\mu$sec. (19 minus 6).

This 13.0 $\mu$sec. difference in TOA measurements is critical to the system's ability to identify and separate Mode A and Mode C replies. The typical 1090 MHz "beam burst" of about twenty reply messages received at the Own station transponder during each scan of a scanning SSR beam past Other contains an approximately equal mix of Mode A and Mode C reply messages. Importantly, all Mode A replies will have shorter TOAs, relative to P2, than similar TOAs of Mode C replies. Because the "mimic" of the beam received on 1090 MHz at Own station will contain the interrogating radar's PRP, and the spacing and interlace pattern of the Mode A and Mode C interrogation messages, by initiating time of arrival (TOA) measurements with a P2 pulse, two "families" of TOA's, both referenced to P2 time, are created, one family of essentially equal TOAs for Mode A and another family of essentially equal TOAs for Mode C. By virtue of the 13 $\mu$sec. time differential between the two families of TOAs, and the fact that the reply messages are contained in the same "burst", they can be readily identified and separated.

Other objects, features and advantages of the invention will become apparent, and its construction and operation better understood, from the following detailed description when read in conjunction with the accompanying drawings.

BRIEF DESCRIPTION OF THE DRAWINGS

FIGS. 6A and 6B placed together side by side as shown in FIG. 7 is a block diagram, partly functional, of a collision avoidance system embodying the invention.

DESCRIPTION OF THE PREFERRED EMBODIMENT

Figure 1:
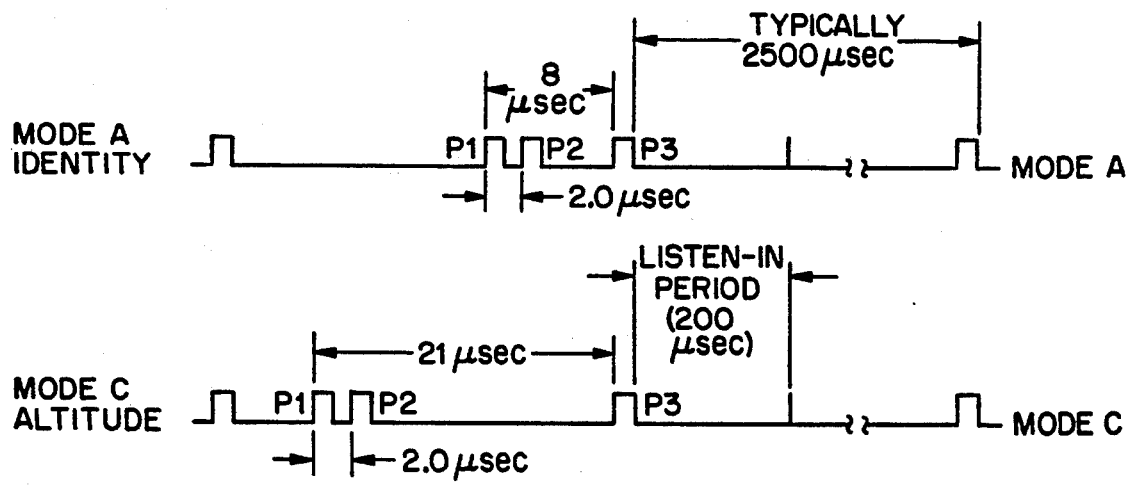
FIG. 1, to which reference has already been made, are waveforms depicting standardized Mode A and Mode C interrogation signals.
Figure 2:
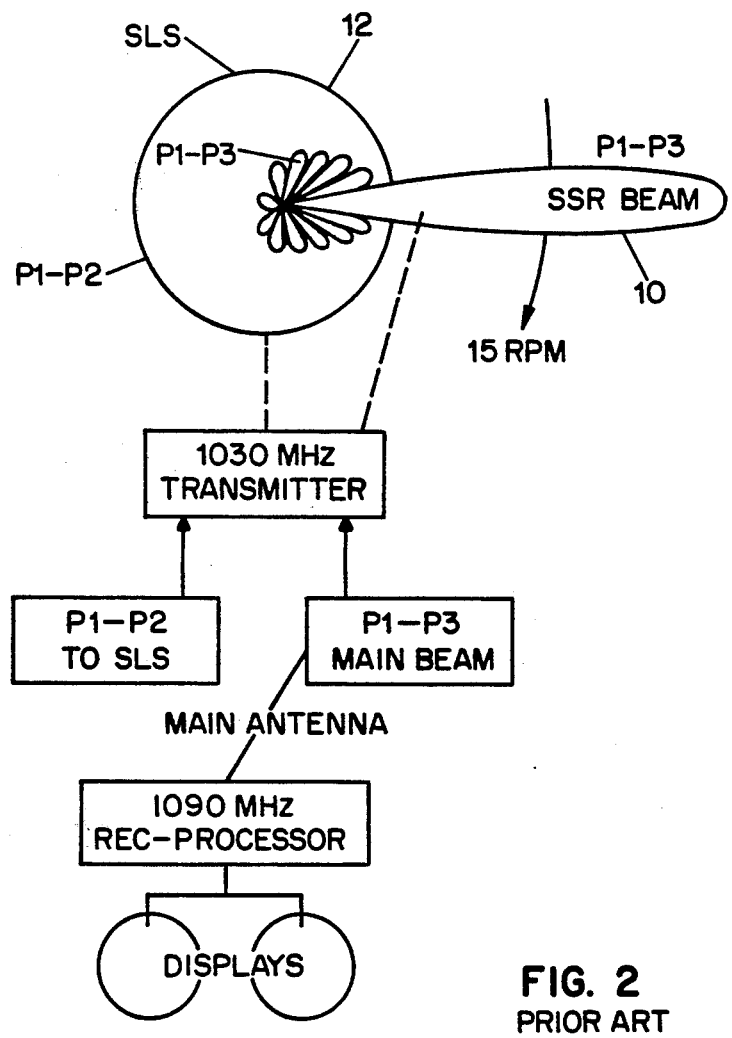
FIG. 2, also referred to previously, is a simplified diagram of a ground SSR interrogation system and depicts the radiation patterns of "old" antenna systems.
Figure 3:
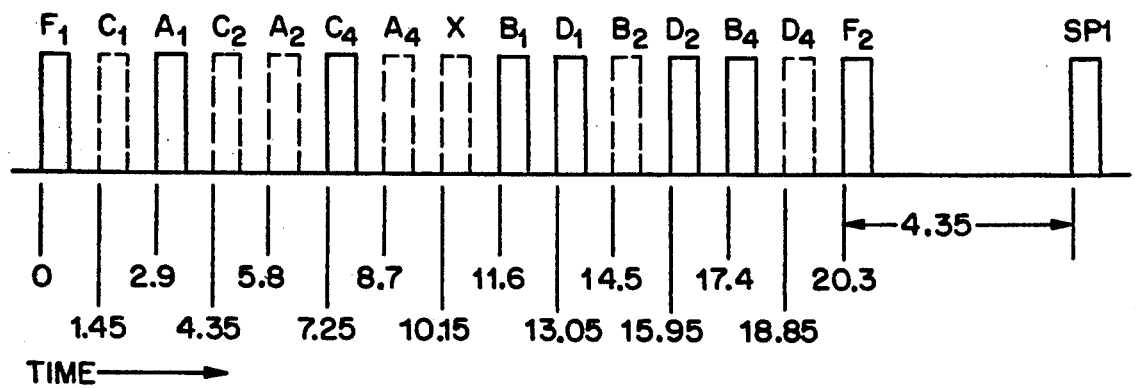
FIG. 3, previously referred to, is a diagram showing the standardized code characteristics of reply messages.

Briefly referring again to FIG. 4, newer ground SSR stations differ from the one depicted in FIG. 2 in the significant respect that they have a phased array antenna which creates the interrogation radiation pattern shown in plan view in FIG. 4 comprising a narrow clockwise rotating main beam 16 and a much wider "egg-shaped" side lobe suppression control pattern 14 which is aligned with, and rotates along with, the narrow scanning beam. The side lobes of the main beam of the new antennas are very low in signal power, which greatly reduces the useful range of systems such as that described in the '755 patent that depends for its operation on direct reception of P1–P3 pulses contained in the multi-beam side lobes. All SSR ground stations, whether equipped with the "old" or the newer antenna system, transmit on the main scanning beam at a frequency of 1030 MHz, the internationally standardized interrogation signals shown in FIG. 1, consisting of three 0.80 μsec. pulses; equal-amplitude P1 and P3 pulses separated by a specified interval and a lower amplitude P2 control pulse separated from the P1 pulse by 2.0 μsec. The ATCRBS (SSR) system relies on pulse amplitude comparison between pulses P1 and P2 as received by the transponder to prevent response to side lobe interrogation, and the Standards therefore specify that the radiated amplitude of P2 at the antenna of the transponder shall be (1) equal to or greater than the radiated amplitude of P1 from the side When main beam P1 pulse levels exceed P2 pulse levels, P3 pulses are no longer suppressed and the transponder replies by transmitting on 1090 MHz over the desired arc of main beam interrogation. The signal strengths at different azimuths outside the main beam's angular sector are such that the P2 or P1–P2 combination is always greater than the P1–P3 combination and thereby "suppress" any transponder, preventing it from receiving P3 pulses contained in the side lobes.

Figure 5:
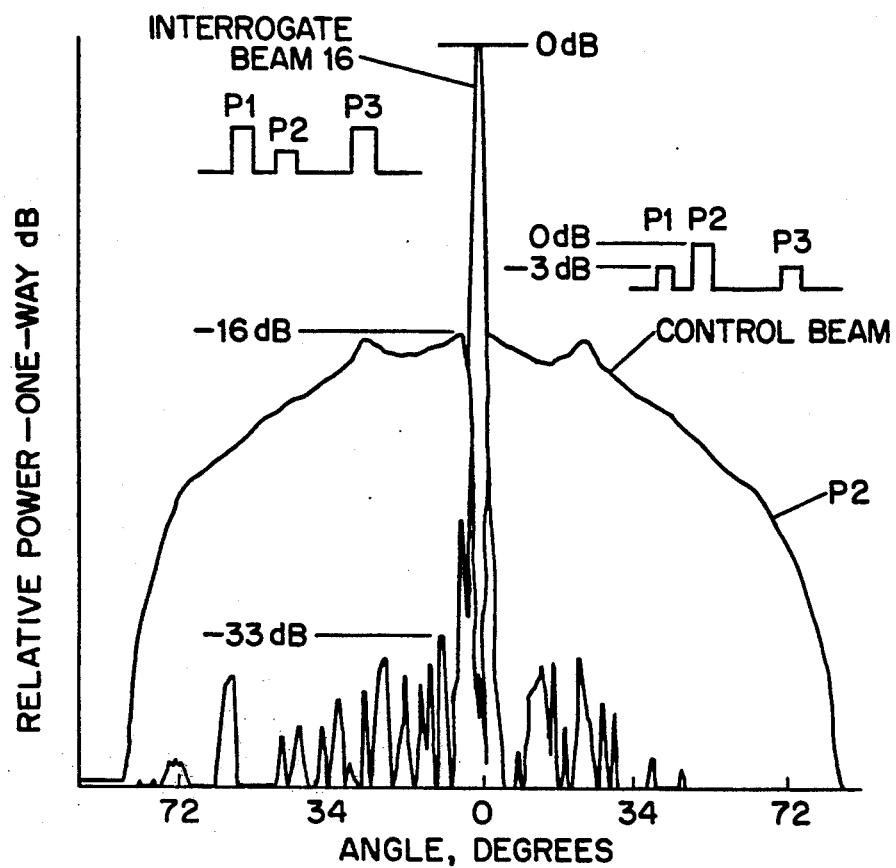
FIG. 5 is a rectangular plot of the interrogation beam pattern and control beam pattern typical of the new antenna systems.

Side lobe suppression control pulses P2, synchronously locked to the timing of the main beam P1–P3 pulses, are radiated at the same frequency using the same time-shared transmitter, i.e., 1030 MHz, on a control pattern. In much of the United States the control pattern is as depicted in FIG. 5, a predominant P2 pulse, a P1 pulse 3 dB down from the level of P2, both of which dominate a P3 pulse, with the P1–P2 pair dominating the P1–P3 side lobe pulse pairs. In Great Britain and in some European countries the control signal of FIG. 5 consists of only the P2 pulse which predominates any received P1 or P3 pulse outside the main beam and, accordingly, will suppress the transponder when a P1 from a strong side lobe combines with the control pattern's single P2.

Figure 4:
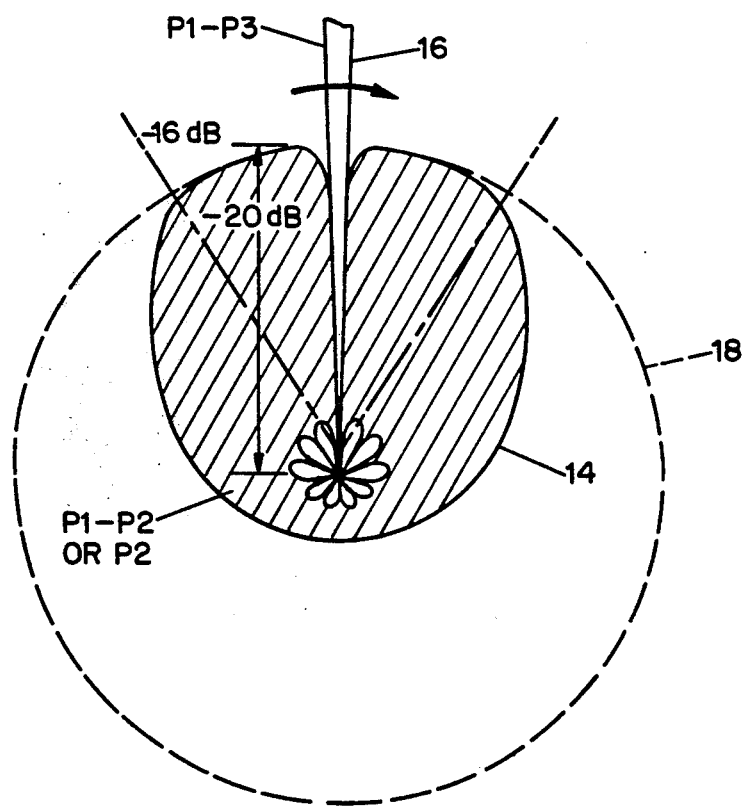
FIG. 4, to which reference has previously been made, shows the integrated radiation pattern of the "new" antenna systems coming into use in SSR systems.

The relative amplitude levels of the main beam 10 and its side lobes and the SLS control pattern of the "old" antenna system shown in FIG. 2 are quantitatively depicted in FIG. 5, wherein all levels are indicated in terms of dB down from the peak level (0 dB) of the main beam 10 used for transmitting interrogation signals on 1030 MHz. The peak signal level of the control beam typically is 16 to 18 dB below the peak level of the main beam. At any azimuth the relative amplitude of the pulses changes with the rotating antenna's instantaneous direction such that the level of pulse P2 is greater than that of P1 in all directions except in the direction of the main beam. Similarly, as shown in FIG. 4, the relative amplitude of the pulses change with antenna direction such that the signal strength of the P2 pulse is greater than that of any P1–P3 pair in all directions except for the narrow angular sector of the main beam. Thus, the "old" and the improved antenna systems both produce radiation patterns which contain P2 pulses greater in strength than P1–P3 pulses over a wide angular sector except in the main interrogate beam which essentially bisects the angular sector. Importantly, this insures long range reception of P2 pulses, both before and after passage of the main beam through a transponder's location, whether radiated by an "old" or a "new" antenna, so as to be available for TOA timing purposes in the event normally-used P3 pulses are absent.

Figure 6A:
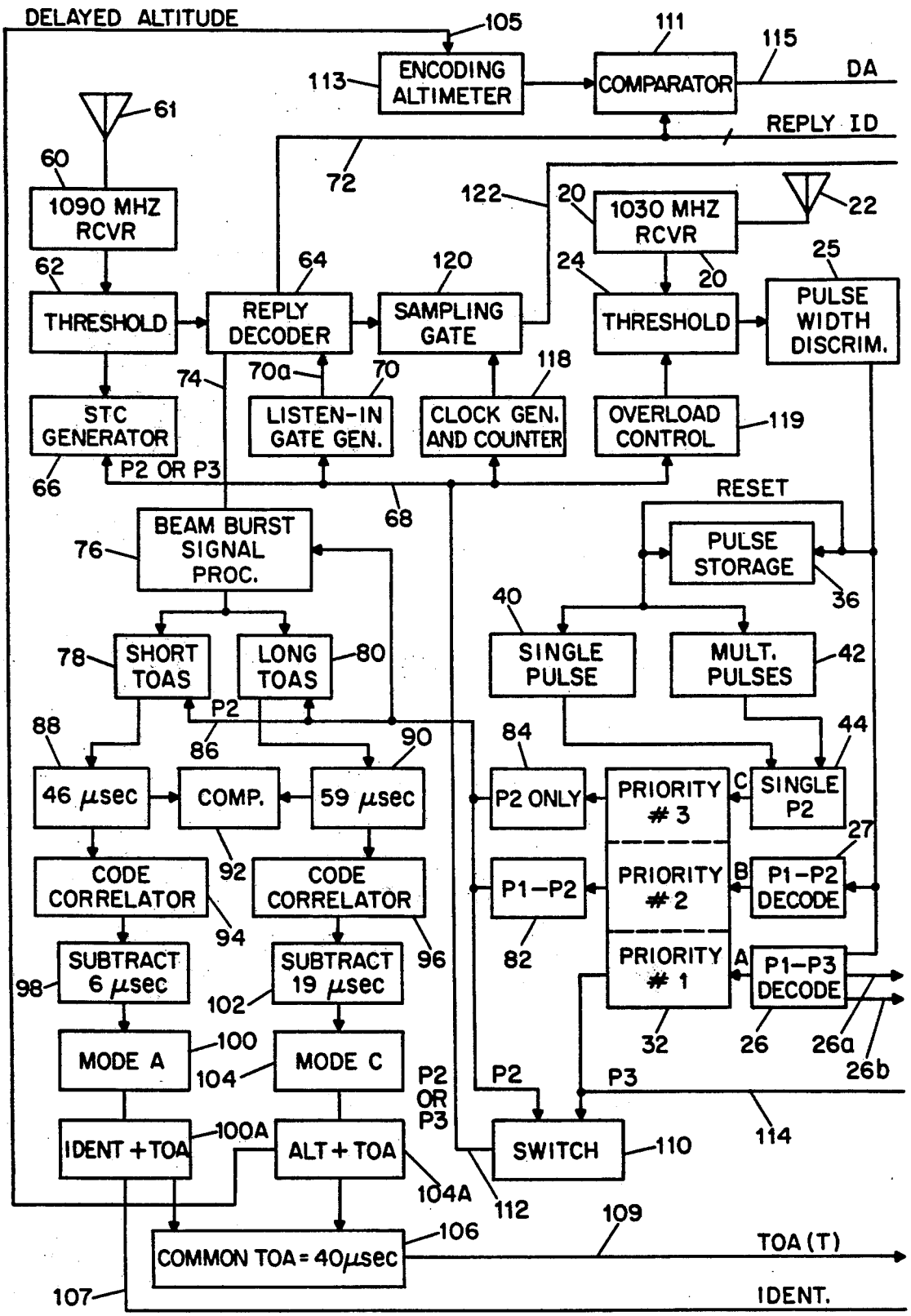

Referring now to FIGS. 6A and 6B, a receiver 20 is designed to receive via an antenna 22 standard interrogation signals and side lobe suppression signals transmitted at the SSR frequency of 1030 MHz from a ground station. The antenna may be a highly directive antenna pointed at a distant radar in the case of a passive ground radar, or it may be omnidirectional for an airborne application; the invention will be described in an airborne environment. Because of constraints placed on the location of antennas on aircraft, it is typical to use a single antenna that both receives at 1030 MHz and transmits at 1090 MHz located on the bottom of the aircraft, especially in the case of small general aviation aircraft, although sometimes both top and bottom mountings are used with two receivers to create a diversity system. The bottom antenna mounting is preferred in a low-cost system because the ground antennas are beneath the aircraft with the consequence that a bottom mounted antenna receives a stronger signal than an antenna mounted on the top of the aircraft.

The output of receiver 20 is applied to a threshold device 24 arranged to pass to a pulse width discriminator 25 any output from receiver 20 exceeding a predetermined threshold level. The pulse width discriminator eliminates all pulses except those having a pulse width which satisfies the 0.80 μsec. width and other specifications of standard interrogation pulses. The qualifying pulses are passed to a P1–P3 decoder 26 designed to provide an output on line 26A when an identity (Mode A) interrogation is received, or an output on line 26B when an altitude (Mode C) interrogation is received. These outputs are applied as information inputs to a switch 28.

The P1–P3 decoder 26 also provides an output on line A which represents the P3 pulse of each received and decoded interrogation containing P1 and P3 pulses spaced by either 8.0 μsec. or 21.0 μsec., establishing that the receiver is being interrogated by the main beam of an SSR or that the SSR is sufficiently close to Own that the signal strength of the main beam side lobes is high enough for P1-P3 pulse pairs to be received consistently. All P3 pulses provided on line A by decoding of received P1-P3 pulse pairs are passed with first priority by a priority selector device 32 for use as the synchronizing signal for measuring TOA's.

The 0.8 μsec. pulses passed by pulse width discriminator 25 are applied to a P1-P2 decode 27 which provides an output on line B when the received interrogation passed by threshold device 24 and pulse width discriminator 25 contains two 0.80 μsec. wide pulses spaced, between their leading edges, by 2.0 μsec., which establishes that the system is receiving P1-P2 pulse pairs conveyed by the SLS wide beam control pattern of an SSR within the extended operating range of such stations. The amplitude of P1 compared to P2 can differ, but a pulse pair decode can occur so long as both are above threshold within a typically 50 db dynamic range. An output on line B is assigned second priority by priority selector device 32 and is coupled to a box 82 labeled "P1-P2" for utilization in a manner to be explained later.

The interrogation pulses passed by threshold device 24 and pulse width discriminator 25 are also applied to a pulse storage device 36 which is repeatedly opened and closed by a reset line 38 at 50.0 μsec. (±25 μsec.) intervals to provide an approximately 50 μsec. "window" during which the applied signal is examined to determine whether any other pulse or pulses similar to a single P2 pulse have appeared either before or after it. Thus, absent P1-P3 pairs, P1-P2 pairs, or "stray" pulses within the 50 μsec. window, a "stand-alone" P2 pulse can be detected. The output of this "window", which will be either an 0.8 μsec. wide pulse or multiple similar pulses, is applied in parallel to a processor which includes a unit 40 that examines the stored data and passes only one single 0.8 μsec. wide pulse, if present, and to a unit 42 which examines the same stored data and detects if there are other 0.8 μsec. wide pulses contained within the 50 μsec. "window" period. If unit 42 determines that multiple pulses are not present, a "kill data" bus incorporated therein is not activated and precludes an output from unit 42; when the "kill data" bus is not activated a single pulse detected by unit 40 is passed to one input of a unit 44 labeled "Single P2" and provides an output on line C, establishing that only a single P2 pulse exists within the 50 μsec. window. If, on the other hand, unit 42 detects additional pulses, the "kill data" from unit 40 applied to a second input of gate 44 will kill or terminate such pulses including a single P2 pulse detected by unit 40.

The just-described process is available again immediately after either the "killing" of multiple 0.80 μsec. pulses or the passing of a stand-alone P2 pulse. Since, on average, 1600 P2 pulses can occur in a single rotation of the main beam (4.0 seconds/rotation × 400 (PRP)), the killing of a few stand-alone P2 pulses that may result from mutual interference of multiple SSRs is generally insignificant in low and medium densities of SSR stations and the system will operate without them. For example, if the P2 pulse is killed because of the presence of multiple pulses in the window, which is wide enough to include P1-P3 messages, and this occurs say four times during the beam rotation period of four seconds, sixteen out of 1600 stand-alone P2 pulses would be lost, but the same sixteen would not necessarily be lost during the next beam rotation. However, on such occasions the P1-P3 pairs or P1-P2 pairs would be used to create the "P3 time" via priority selector 32. Because the beam rotations of multiple adjacent SSRs and, accordingly, their interferences, are random, and the system is flexible enough to utilize data from two or three beam rotations, of two or three SSRs, the loss of such P2 pulses on an single rotation is insignificant. In a multiple SSR environment the priority can change continuously during a period corresponding to average beam rotation times. The single P2 pulses produced by this process are coupled to a box 84 labeled "P2 Only" for utilization in a manner to be explained.

The P2 pulses derived from either box 82 or box 84 are applied as one input to a switch 110, and P3 pulses, that is, the priority #1 output of priority selector 32, are applied as a second input to the switch. Switch 110 is so designed that in the absence of P3 timing pulses from selector 32 it feeds P2 pulses via line 112 to a line 68. If, on the other hand, priority #1 P3 timing is available from priority selector 32, switch 110 instead applies the P3 pulses via line 112 to line 68 for utilization in a manner to be described.

Reviewing the operation of the SSR in the just-described context, and assuming another example of a single SSR received at Own transmitting only P2 pulses (stand-alone, absent P3, absent P1) on its SLS control pattern and a main beam rotation period of five seconds, for about 99% of the time after the main beam carrying P1-P3 pulses passes the receiver, P2 pulses will be present at the PRP of the SSR, which, for example, might be 400 pulses per second, thereby producing about 2000 "stand-alone" P2 pulses nearly all of which pass through the 50-μsec. window. For the single SSR example, during the relatively long period of about 4.8 million μsec. for each rotation of the main beam in an English or European radar, the "stand-alone" P2 pulses will be separated by about 2500 μsec., with the consequence that there will be a probability of only about 50/2500, or 2% of possible "stray" P2 pulses being present in the 50 μsec.-wide window and passed as a true P2 pulse to priority selector 32. Because P2-only pulses are somewhat less reliable than a true P1-P2 pair for synchronizing the start of "listen-in" time, they are assigned a lower priority, priority #3, by priority selector 32. Should a maximum main beam side lobe conveying P1 pulses combine with a P2 pulse, priority selector 32 determine that P1-P2 priority be used. Thus, the priority selector adapts to available signals continuously throughout the time it takes for a main beam rotation.

The interrogation code priority selector 32 is so arranged that if adequate P1-P3 data is available over a given period of time, for example a few interrogation periods, then that data is used as the timing signal for measuring TOAs, just as in the system described in U.S. Pat. No. 4,486,755. However, if the SSR beam is pointing elsewhere than toward Own station, and its side lobes are at such a low level that adequate P1-P3 data is not available at Own's location, then, if employed in the United States (with P1-P2 pairs on the control pattern), decoded P1-P2 data will usually be available over a wide angular sector surrounding and moving with the main scanning beam. The United States has a population of several hundred SSR's that radiate precisely separated (2.0 μsec) pairs of P1 and P2 pulses on the SLS control pattern. If adequate P1-P2 data should be unavailable, as, for example, in systems employed in England or other European countries (and occasionally some United States SSRs) wherein only P2 pulses are transmitted on the SLS control pattern, the lower priority single P2 pulse data is utilized.

Thus, if priority #1 data is available for a "listen-in" period of 200 μsec., priority selector 32 insures that priority #2 and priority #3 data is not used. If priority #1 data is missing, but priority #2 data is available, the latter is utilized for that "listen-in" period in preference to priority #3 data. After each "listen-in" period the priority selector 32 selects in descending order the best, most likely and most useful received data at that instant. Recalling that the 200 μsec. "listen-in" period is only 10% or less of the average SSR PRP of say, 2500 μsec., following the close of the listen-in period there remains a period of about 2300 μsec. within which other radar interrogations can be interleaved. This creates many synchronizing timing signals for TOA measurements from which the best are selected by priority selector 32, thereby maximizing the operating range of the equipment while maintaining a high degree of integrity. The selections are automatic, which maximizes the data from an SSR throughout its rotation period and avoids loss of TOA data when deep nulls between main beam side lobes are pointing at the Own aircraft. For example, the present invention should extend the useful range from an SSR to an Own's airborne collision warning system constructed in accordance with U.S. Pat. No. 4,486,755 by as much as four or five times, say, from 20 miles to as much as 80-100 miles from an SSR. This can increase useful coverage area of the herein described system relative to each SSR's location by as much as twenty-five times, thereby enhancing the desired overlap of multiple SSRs.

To repeat, when P1-P3 pulse pairs are not available, P1-P2 pulse pairs, if available, are preferred over P2-only pulses. However, if P1-P3 pairs and P1-P2 pairs are both absent, P-2 only pulses can, as will be explained presently, be used to initiate a 200 μsec. "listen-in" period for TOAs. In addition to being "adaptive" to the "old" and "new" antenna systems, the just-described decoding/priority selection process is "adaptive" in the sense that it is able continuously to examine received 1030 MHz signals to determine every few hundred microseconds (e.g. 200-300 μsec.) which of the three possible priorities are available and which of them should be utilized at that instant to time the start of the "listen-in" period. If, for example, interrogations are received from two SSRs, one of which has P1-P2 pulse pairs on the SLS control pattern and the other has only P2 control pulses, and P1-P3 pulse pairs are received from neither, the system can extract useful information from both, concurrently, as they interrogate other aircraft in the vicinity of Own. If too many SSRs are present, overload control 119 can limit SSR data to say the closest four or five SSRs.

Information contained in reply messages transmitted by Other aircraft is received at the Own station during each scan of the scanning beam of an SSR located within operating range. A 1090 MHz receiver 60, provided with an antenna 61 preferably mounted on the top of the aircraft and designed to receive standard transponder reply signals, is connected to a reply decoder 64 via a threshold device 62 designed to pass any output from receiver 60 exceeding a given threshold level, which level may be controlled by a sensitivity time control generator 66. STC generator 66 is controlled by timing pulses on line 68, which may be P3 or P2 pulses depending on the output of switch 110, to initially provide a relatively high threshold level, and then reduce the level over a period of, say 5 μsec., thereafter maintaining the lower level so as to receive weaker replies until the next P3 or P2 pulse occurs. If the equipment is embodied in a passive ground radar (PSSR), the receiver antenna 64 may be the highly directive, switched beam antenna system described in applicant Litchford's U.S. patent application Ser. No. 07/813,137, filed Dec. 23, 1991, pointed directly at the responding aircraft; if embodied in an airborne system, antenna 61 must be omnidirectional and preferably is mounted on top of the aircraft. Receiver 60 may be similar to usual transponder receivers but receiver 20 is about 20 dB more sensitive so as to be capable of operating at, typically, −91 dBm sensitivity.

A "listen-in" gate generator 70 is connected to line 68 and arranged to produce a gate signal of about 200 μsec. duration following each P3 or P2 pulse applied to line 68. The gate signal on line 70a enables the reply decoder 64, which in the absence of the gate signal is disabled. When enabled, for about 200 μsec., decoder 64 produces an output on lines 72 and 74 which represents either the identity or the altitude information contained in the current reply message, As shown in FIG. 5, each message contains an initial framing pulse F1 and a second framing pulse F2 which follows F1 by 20.3 μsec., the interval between them containing thirteen sub-intervals, of which twelve are currently used, in each of which a pulse may or may not be present, providing for possibility of 4096 different codes, each code representing one or more pieces of information. Since all messages are elicited by interrogation messages alternating between Mode A and Mode C in synchronism with P3 pulses carried by the scanning SSR beam, and both Mode A and Mode C replies utilize the same twelve sub-intervals for carrying information, it is essentially impossible to determine at Own's receiving station, using P2 timing without more data, whether a given message is a response to a Mode A or to a Mode C interrogation.

For example, a "burst" of about twenty reply messages are received by receiver 60 from an Other aircraft during each 360° scan of such Other aircraft by the scanning SSR beams. Each 1090 MHz burst, which represents 50 to 100 milliseconds of main beam dwell time depending upon the type of radar (i.e. whether it is a rapidly rotating airport radar or a slowly rotating en route radar), will produce on line 74 for application to a beam burst signal processor 76 a mix of pulse messages representing identity and altitude of each of the aircraft surrounding the Own station out to the maximum reception range of Own's 1090 MHz receiver (say, 30-40 miles). Processor 76 is enabled by a P2 pulse on line 86, the source of which will be described presently. Each data burst on line 74 is a "mimic" (or imitation) of the SSR beam (or beams) that are interrogating the airspace surrounding Own's transponder and all nearby transponders. The mimic characteristics include exact, unique SSR spacing of interrogation messages (often known as the SSR/PRP characteristics). Since all SSRs are on the same RF channel, they are effectively finger printed or identified by each having a unique PRP "signature" for interrogating; the period may be fixed or it may be staggered. The mimic also creates replicas of the Mode A and Mode C main beam interrogation patterns, such as AACAAC, ACACAC, etc., the exact beam rotation period for any SSR that is being received, the exact measured value of TOAs for Mode A replies and the exact value of TOA measured for Mode C replies when the P2 pulse is used as the start of the listen-in window in place of the P3 pulse start time used in the '755 system.

For the sake of simplicity it will be assumed that the main beam's width interrogates any transponder within its range of coverage, out to 100 miles and throughout an azimuth of 360°, and will elicit twenty replies: ten Mode A reply messages and ten Mode C reply messages. Utilizing the above-discussed observation that because of exact standardized spacing of the P1, P2 and P3 pulses, the measured TOA at Own of Other's identity (Mode A) reply messages, using P2 time, is exactly and always 13 $\mu$sec. shorter than the measured TOA of reply messages from the same Other transponder station elicited by the main beam's Mode C interrogation. When activated by a P2 pulse on line 86 (indicating a lack of P3 data), beam burst signal processor 76, using techniques extensively described in the literature, organizes the "burst" into two "histograms", a "short TOA" histogram of identity code pulses and a "long TOA" histogram of altitude code pulses. The "short" and "long" TOA histograms are applied to units 78 and 80, respectively, which correlate the F1-F2 pulses of a respective histogram relative to P2 time to determine the time of arrival (TOA). Because in this example there are ten short TOAs, by creating a histogram the processor 76 shows that the ten agree with each other closely enough (in TOA and code content) to belong to the same "family" and therefore to a single Other transponder station, and thus amenable to autocorrelation. Similarly, the ten "long TOAs" within the time duration of the beam burst are in sufficiently close agreement to belong to the same "family" and also capable of being autocorrelated. A typical 1090 MHz burst of twenty reply messages, spaced 2500 $\mu$sec. apart, has a duration of 20 × 2500 $\mu$sec. = 50 milliseconds. The following a P2 pulse any associated 20.3 $\mu$sec. message will be received.

The "short" and "long" TOAs are individually correlated, using P2 pulses derived from either priority #2 data (box 82) or priority #3 data (box 84), and applied via line 86 to both of correlators 78 and 80. While each of the TOAs may be of any specific length, depending upon Other station's location relative to that of Own's station, because they are referenced to the P2 pulse and processor 76 is activated by the P2 pulse, the "short" and "long" TOA values in the burst of messages always must differ in length from each other by 13 $\mu$sec. Although a TOA value may be anywhere in the range from 0.1 $\mu$sec. to 200 $\mu$sec., for purposes of the discussion to follow, the "short TOA" will be arbitrarily assumed to be 46 $\mu$sec. and the "long TOA" will then, of necessity, be 59 $\mu$sec. These values are indicated in blocks 88 and 90, and a comparator 92, shown connected between these blocks establishes that the TOA value represented by block 88 is shorter by 13 $\mu$sec. than the TOA value represented by block 90. It will be understood that this 13 $\mu$sec. difference would also be satisfied if, for example, the "short" TOA were 51 $\mu$sec. and the "long" TOA were 64 $\mu$sec.

The correlated "short" and "long" TOAs which may, for example, contain a message composed of $A_1$, $B_2$, $C_4$ and $D_1$ pulses distributed between framing pulses $F_1$ and $F_2$, are applied to similar correlators 94 and 96, respectively, which autocorrelate the code information reply pulse-by-reply pulse. Since 4096 different Other's identity "messages" are possible, when for example two or more successive code patterns agree exactly, the probability of an erroneous output from code correlators 94 and 96 would be less than one in sixteen million (i.e., $(4\times10^3)\times(4\times10^3)$). Thus, the system provides the same enormous discrimination between "false" and "true" codes as that available in current SSR systems.

A "true" TOA of 40 $\mu$sec. for the "short" TOAs is obtained by subtracting (depicted by block 98) 6 $\mu$sec. (i.e., the P2-P3 spacing in Other's Mode A) from the 46 $\mu$sec. TOA represented by the autocorrelated code output of correlator 94, the same as if P1-P3 pulse pairs had been received and the TOA timed with respect to the P3 pulse instead of P2. Thus, the described correlations automatically identify the family of "short" TOAs as Mode A identification codes, which is outputted from block 100.

It is important to recognize that the TOA and the code structure really can never be separated; since the TOA is referenced to the F1-F2 framing pulses, specifically, F2 timing relative to the P3 timing (P3 actual or P2-corrected time), the information contained between F1 and F2 is always "locked-in". The code information may occasionally be garbled, but it is nevertheless locked to TOA and cannot be separated. One or two garbled messages, if present in a burst, are ignored as they do not correlate with the several others.

A "true" value of 40 $\mu$sec. for the "long" TOAs is obtained by subtracting 19 $\mu$sec. (Other's P2-P3 Mode C interrogation spacing) from the 59 $\mu$sec. TOA represented by the autocorrelated output of code correlator 96, as depicted by block 102. Because of the above-described separation of families of "long" TOAs (representing Mode C) from families of "short" TOAs (representing Mode A), the "true" TOAs depicted by blocks 100 and 104 are both 40 $\mu$sec. Other's ten Mode A replies on 1090 MHz agree exactly with Other's ten Mode C replies by the described arithmetic corrections. Consequently, twenty consistent TOA measurements are available at Own from reply messages received from Other which can be separated to provide an altitude code and an identity code of Other each associated with the same TOA, as depicted by blocks 100A and 104A. This enables the described diverse data to be combined, as represented by block 106, timed to "P2-time" but corrected after the beam burst to P3 time, just as if it were timed from two P1-P3 decodes of 8.0 $\mu$sec. and 21.0 $\mu$sec. Arbitrarily assuming a Mode A code of 1253, and a Mode C code representing an altitude of 3000 feet, by the above process it is determined from twenty replies from this aircraft (i.e., No. 1253) that the true TOA is 40 $\mu$sec. and true altitude is 3000 feet.

Thus, the just-described system produces: an output on line 105 representing altitude information contained in the current reply message; an output on line 107 representing identity information contained in the current reply message; and an output on line 109 representing the distance between Own and Other. The output on line 105 is applied to an altitude comparator 111 having as a second input data provided by an encoding altimeter 113 representing Own's altitude encoded in a similar format. Comparator 111 produces an output representing the difference between Own's and Other's altitudes when a Mode C reply occurs. The output of comparator 111 is an information input to switch circuit 28.

Briefly reviewing the priority selection process, if priority #1 P3 timing is available from priority selector 32, it is fed via line 114 to a gate generator 116, the function of which will be described presently, and via switch 110 and line 112 to line 68. In the absence of P3 pulses from selector 32, P2 pulses produced at the output of either box 82 or 84 are applied to line 86 and are also coupled via switch 110 and line 112 to line 68. Line 68 is also connected to an overload control circuit 119 arranged to control the threshold level of device 24, as in a standard ATCRBS transponder. It will be understood that any one or all three of the signals outputted by priority selector 32 can be operating concurrently depending upon the number and relative positions of multiple 1030 MHz SSRs within the surrounding environment, and the strength of the signals that are present. The extended ranges afforded by P2 timing increases the likelihood that at least two SSRs will be received, thereby creating throughout a much greater airspace higher accuracy and much fewer false alarms than the pseudo-range methods described in U.S. Pat. No. 4,486,755. The output of electronic switch 110, with P1-P3 pulse pairs always taking precedence if available, can similarly be fed to appropriate connection points of the PSSR system described in U.S. Pat. No. 4,115,771.

Returning now to the description of the collision avoidance system, a clock generator and counter 118 is arranged to be reset by each P3 pulse appearing on line 68, and to apply the current count, which may be a numerical representation of the number of microseconds elapsed since the last preceding P3 pulse was applied to counter 118. Each P2 pulse applied to a gate 120 transfers the current count to line 122. The output of gate 120 on line 122 represents the differential time of arrival TOA of a received interrogation and the corresponding received reply from a transponder at an Other station. Clock generator and counter 118 is not enabled by P2 pulses on line 68.

Whenever P3 is present on line 68, reply decoder 64 produces an output on line 72 representing either the identity or the altitude information contained in the current reply message. This output is applied to comparator 111 and to switch circuit 28; comparator 111 produces an output representing the difference between Own's and Other's altitude when a Mode C reply occurs. The output of comparator 111 in response to a Mode A reply will be spurious. In either case the output of comparator 111 is an information input to switch 28.

Multiple line 72 is connected to supply all decoded outputs timed to P3, both altitude and identity, from decoder 64 as information inputs to switch circuit 28. When a P1-P3 identity interrogation is received, line 26a is energized to actuate switch 28 to pass the identity message to switch output line 124. The output of comparator 111 at this time is discarded. When a P1-P3 altitude interrogation message is received, decoder 26 energizes line 26b, thereby activating switch circuit 28 to apply the output of comparator 111 to line 124, discarding the input from line 72.

Lines 122 and 124 are connected to a reply storage device 126, which may comprise a plurality of digital registers arranged in known manner to store associatively the TOA and identity or differential altitude information corresponding to approximately twenty successive reply messages. Preferably, the differential altitude information is stored associatively with the identity and differential time of arrival data. The information contained in each new reply message displaces the oldest such stored information, so the storage device 126 maintains a running account of identification and associated TOA and differential altitude information.

A comparator 128, when enabled by P3 via gate generator 116, compares the associated entries in storage device 126 with each other to select those nearly identical entries that appear currently in the reply storage device 126. When such a match occurs the respective entry is transferred to a selector device 130. The gate generator 116, which is similar to the "listen-in" gate generator 70, is arranged to enable the comparator 128 for a period, beginning at the end of the listen-in gate, of sufficient duration for completion of the operation of comparator 128.

The output of comparator 128 may and generally will, include several entries containing the same identity information but substantially different TOA information. The selector 130 rejects all such entries except the one containing the largest TOA, which it transfers, together with the associated identity and differential altitude information, to a selected reply storage device 132. Storage device 132 is similar to device 126, but retains its entries for a period somewhat longer than the longest radar beam rotation period to be expected, say fifteen seconds. If during that time a new entry with a larger TOA value is presented, the new larger value of TOA is substituted for the old, smaller value associated with that particular identity.

It will have been recognized that the processing performed by reply storage device 126 and comparator 128 is functionally equivalent to that accomplished in the processing of "short" and "long" TOAs 78 and 80 when beam burst signal processor 76 is enabled by the presence of a P2 pulse on line 86. As just mentioned, when P1-P3 pulse pairs are available, reply storage 126 device stores approximately twenty successive reply messages, which is the equivalent of storing a total beam burst, just as is done by the signal processor 76. In other words, when P2 is present on line 68, signal processor 76 is activated and all information contained in about twenty successive reply messages, which takes about 50 milliseconds (50,000 μsec.) to complete, is processed relative to P2 time. When P3 is present on line 68, signal processor 76 is disabled and the approximately twenty successive reply messages are, instead, stored in reply storage device 126 and compared in comparator to select those nearly identical entries that appear currently in the reply storage device 126. This being the case, whenever P2 pulses are being used for timing, the identity and TOA information present on lines 107 and 109, respectively, and the differential altitude information present on line 115, are all applied to selector 130, instead of information supplied from comparator 128 when P3 timing is available. As before, selector 130 selects information entries containing the largest TOA, which it transfers, together with the associated identity and differential amplitude information, to selected reply storage device 132.

The storage device 132 is connected to a threat detector 134 designed to transfer, following a delay of 15 seconds, any entry containing a differential altitude of less than a given valve, such as 3000 feet, and a TOA of a given valve, such as less than 36 μsec., to a display logic device 136. At the same time, detector 134 provides an output on line 138 to start an alarm timer circuit 140 which may be similar to "listen-in" gate generator 70, but designed to provide an output also lasting about 15 seconds. The output of timer 140 actuates an alarm device 142.

The display logic device 136 converts the output of detector 134 to a form suitable for display on an identity indicator 144, a differential altitude indicator 146 and a pseudo-range indicator 148. The pseudo-range indication is a display of the differential TOA in terms of distance, i.e., one-half the distance radiation travels during the time TOA. This is what is meant by pseudo-range and corresponds to the actual range to a degree that depends upon the positional relationship between Own and Other stations and the SSR. The pseudo range is never greater than the actual range. When Own and Other stations are both interrogated by a number of SSR's, the likelihood of which is enhanced by the present invention, the largest value of the pseudo-range associated with a particular Other may closely approximate the actual range of said Other.

Figure 8:
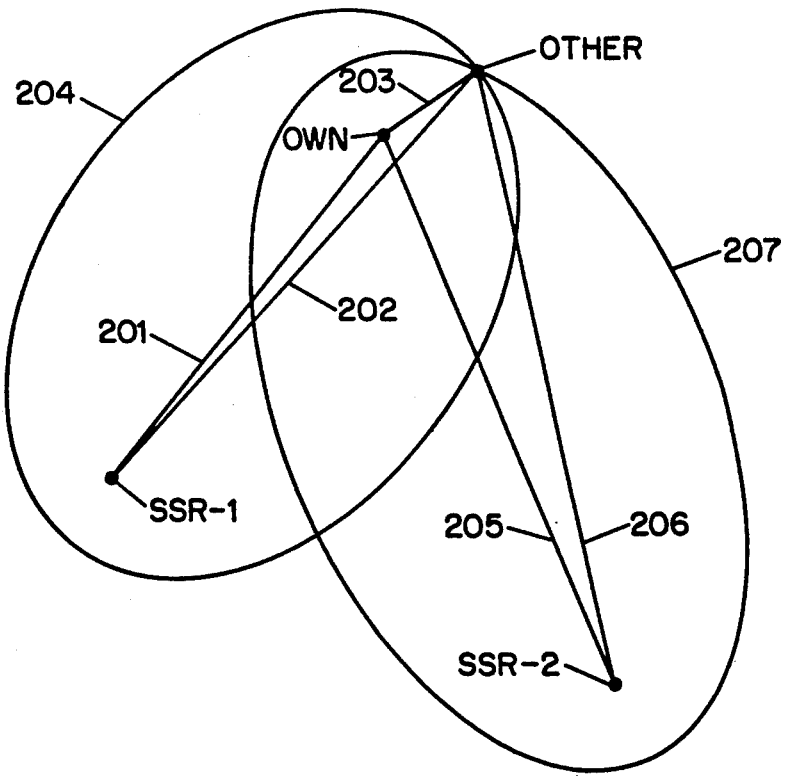
FIG. 8 is a geometric diagram used in explaining the operation of the system of FIGS. 6A–6B with two favorably located SSRs.

Referring to FIG. 8, which is a plan or map-like representation showing the locations of an Own, an Other and two SSRs, line 201 represents the distance from SSR-1 to Own, line 202 represents the distance from SSR-1 to Other, and line 203 represents the range between Own and Other. The differential time of arrival T1 in this case is the difference between the sum of the travel times over paths 202 and 203 and the travel time over path 201, generally expressed in microseconds. Any particular time T1 defines an ellipse such as 204, which is a locus of Other's position, i.e., time T1 signifies only that Other is at some unspecified point on ellipse 204.

It will be seen in FIG. 8 that lines 201 and 202 are approximately parallel and thus T1 is very nearly twice the propagation delay along line 203, the true range between Own and Other. Thus (cT1)2, referred to herein as the pseudo range associated with SSR-1, is essentially equal to the true range, where c is the propagation velocity.

Line 205 represents the distance from SSR-2 to Other. In this case the differential time of arrival T2 defines ellipse 207 as a locus of Other's position. Owing to the positional relationship between Own, Other and SSR-2, the pseudo range associated with SSR-2, that is (cT2)2, cT2 is considerably less than the true range, and may be shown to be a little more than one-half the true range. Regardless of the relative position of Own and any Other station and any SSR, the pseudo range can never be greater than the true range and generally will be somewhat less. Therefore, in a multiple SSR environment the largest determined pseudo range to a particular Other is always selected by selector 130 as the value most nearly equal to the true range. Thus, the larger TOA associated with SSR-1 is selected as representative of "pseudo-range" of Other from Own.

When an Other station is much closer to the SSR than Own station the pseudo range may become a small fraction of the true range and, if the Other is within the differential altitude limits, may initiate a threat detection when in fact no threat exists. Such false threats are minimized by the action of the STC generator 66 of FIG. 6A controlling the threshold device 62 to reject relatively weak replies received within a few microseconds after reception of an interrogation.

While the principles of the invention have been described with the aid of a block diagram of a currently preferred embodiment, it will now occur to those skilled in the art that the invention can be modified in numerous ways without departing from the spirit of the invention. It is the intention, therefore, that the invention not be limited except as defined by the appended claims.

We claim:

1. A method for detecting at an Own station the proximity of transponder-equipped Other stations, comprising the steps of:
   (a) receiving side lobe suppression signals (SLS) transmitted by SSR stations located within operating range of said Own station;
   (b) receiving reply messages transmitted by transponder-equipped Other stations in response to main beam interrogations of Others by said SSR stations during a predetermined time period following the reception of each SLS signal;
   (c) determining from said received SLS signals and said reply messages a differential time of arrival (TOA) value for each reply message;
   (d) associatively storing said reply messages and TOAs for several of the most recent reply messages representative of a predetermined number of interrogation periods;
   (e) selecting from the TOA values stored in step (d) those TOA values that differ by 13 microseconds;
   (f) subtracting 19 microseconds from the longer TOA values and 6 microseconds from the shorter TOA values selected in step (e), for establishing a common TOA value representative of what the TOA value would have been had main beam interrogation signals, rather than SLS signals, been used in step (c) to determine TOA values; and
   (g) decoding reply messages having longer TOA values as altitude codes and reply messages having shorter TOA values as identity codes.

2. The method as set forth in claim 1, wherein said method includes the further steps of:
   (h) selecting the largest differential TOA related to each identified Other station; and
   (i) producing a threat alert in response to any such selected differential TOA below a predetermined value.

3. The method as set forth in claim 1 or claim 2, wherein said method includes the further steps of:
   (j) determining the differential altitude of each said identified Other station with respect to Own station's altitude;
   (k) storing as entries said differential altitude data associatively with said identity and TOA data; and
   (l) discarding all stored associated groups of identity and differential altitude data with an altitude difference greater than a predetermined value above Own's altitude or a second predetermined value below Own's altitude.

4. The method set forth in claim 1, wherein in step (b) said predetermined time period is initiated by a P2 pulse contained in a received SLS signal, and wherein the method includes the further steps of:
   correlating from the entries of step (d) those TOA values that are substantially duplicated a predetermined number of times, and
   storing separately each such correlated TOA values for a storage period at least as long as the longest SSR beam rotation period.

5. In a method for detecting at an Own station the proximity of a transponder-equipped Other station, comprising the steps of:
   (a) receiving identity and altitude interrogation signals composed of differently spaced P1-P3 pulse pairs transmitted by each SSR within operational range of said Own station when said Own station is within the main beam or main beam side lobes of an SSR;

(b) receiving only P2 pulses or P1-P2 pulse pairs transmitted by the side lobe suppression (SLS) control signal pattern associated with the main beam of each said SSR when said Own station is within operational range of such SLS P2 pulses or P1-P2 pulse pairs;

(c) receiving reply messages transmitted by transponder-equipped Other stations in response to main beam interrogation of Others by said SSR stations during a predetermined period following reception of each P3 interrogation pulse or the P2 pulse of each SLS signal; and (d) when P1-P3 pulse pairs are not received in step (a) and P2-only pulses or P1-P2 pulse pairs are received in step (b), determining from the time relationships between each received P2 pulse and each received reply message elicited by an associated interrogation signal, the identity and altitude of each said Other station and differential time of arrival (TOA) data for each identified Other station with respect to each said SSR.

6. The method set forth in claim 5, wherein step (d) includes the steps of:

($d^1$) associatively storing successive reply messages and TOA values for each for a predetermined number of interrogation periods;

($d^2$) selecting from the TOA values stored in step ($d^1$) those TOA values that differ by 13 microseconds;

($d^3$) subtracting 19 microseconds and 6 microseconds from the longer and shorter TOA values, respectively, selected in step ($d^2$) to establish a common TOA value representative of what the TOA value would have been had P3 pulses, rather than P2 pulses, been used in step (d) to determine TOA values; and wherein said method includes the further steps of:

(e) selecting the largest differential time of arrival related to each said identified Other station; and (f) producing a threat alert in response to any such selected differential TOA below a predetermined value.

7. The method set forth in claim 6, including the further steps of:

identifying each said Other station from its reply messages;

determining the differential altitude of each identified Other station with respect to Own station;

storing as entries said differential altitude data associatively with said identity and differential time of arrival data, and discarding all stored associated groups of identity and differential altitude data with an altitude difference greater than a first predetermined value above Own's altitude or a second predetermined value below Own's altitude.

8. A collision avoidance system for detecting at an Own station the proximity of transponder-equipped Other stations, comprising:

(a) means for receiving interrogation messages consisting of P1-P3 pulse pairs transmitted by each SSR within operational range of said Own station when said Own station is within the main beam of an SSR and also when said Own station is within a side lobe of said main beam, and for also receiving side lobe suppression (SLS) messages consisting of P1-P2 pulse pairs or P2-only pulses associated with the main beam of each SSR when said Own station is within operating range of said SLS transmission;

(b) means for receiving reply messages transmitted by any transponder-equipped Other station in response to such main beam interrogation messages during a predetermined period following reception of each P3 pulse of an interrogation signal or P2 pulse of an SLS signal at said Own station;

(c) means for determining, from the time relationships between each said received P3 pulse or P2 pulse and each said received associated reply message, differential time of arrival (TOA) data for each of said Other stations, reply messages with respect to each said SSR;

(d) means for storing as entries in a running account each successive reply message received by means (b) and the corresponding time of arrival data determined by means (c) for a predetermined number of interrogation repetition periods;

(e) means for matching from the entries stored in means (d) those messages and corresponding TOA data that are substantially duplicated a predetermined number of times;

(f) means for selecting in descending order of priority (1) reply messages associated with P1-P3 interrogation signals; (2) in the absence of replies associated with P1-P3 interrogation signals, reply messages associated with P1-P2 side lobe suppression signals; and (3) in the absence of replies associated with either P1-P3 interrogation signals or P1-P2 side lobe suppression signals, reply messages associated with P2 only side lobe suppression signals, and determining from the selected reply messages a differential time of arrival (TOA) value for each reply message;

(g) means for comparing time of arrival data of reply messages selected in accordance with step (f)(2) or step (f)(3) to measure short and long TOAs that differ by 13 microseconds, and for subtracting 6 microseconds from said short TOAs and 19 microseconds from said long TOAs to establish a common TOA value;

(h) means for decoding said short TOAs as identity codes and said long TOAs as altitude codes; and (i) means for combining the outputs of comparing means (g) and decoding means (h) to produce, in the absence of reply messages associated with P1-P3 interrogation signals, identity and altitude data of Other stations, and time of arrival (TOA) data for each said identified Other station, equivalent to what the TOA value would have been had reply messages associated with P1-P3 interrogation signals been received.

9. A collision avoidance system as set forth in claim 8, wherein said system further comprises:

(j) means responsive to reply signals selected in accordance with step (f)(1) for identifying each said Other station according to it reply messages;

(k) means for determining from the time relationships between the P3 pulses of each received interrogation signal and each said received reply message elicited thereby differential time of arrival (TOA) values for each of said identified Other stations with respect to each SSR;

(l) means for storing as entries in a running account each successive identify obtained by means (j) and the associated time of arrival values obtained by means (k) for a predetermined number of interrogation periods;

(m) means for matching from the entries to means (1) those identities and time of arrival data that are substantially duplicated a predetermined number of times;

(n) means for storing the entry for each such matched identity and corresponding time of arrival data for a predetermined storage period;

(o) means for selecting the largest differential time of arrival related to each said identified Other station;

(p) producing a threat alert in response to any such selected differential TOA below a predetermined value; and;

(q) means for coupling identity and altitude data produced by means (i) to said means (o) for selecting.

10. A collision avoidance system as set forth in claim 9, wherein said system further comprises:

(r) means for determining the differential altitude of each said identified Other station with respect to Own station; and (s) means for coupling said differential altitude data to said means for storing (n) for storage associatively with said identity and differential TOA data.

11. In a collision avoidance system at an Own station which includes first receiver means for receiving identity and interrogation messages composed of differently spaced P1-P3 pulse pairs transmitted by the main beam of each SSR within operational range of said Own station when said Own station is within the main beam or main beam side lobes, of an SSR, and for also receiving P2-only pulses or P1-P2 pulse pairs transmitted by the side lobe suppression control (SLS) pattern associated with the main beam of each SSR when said Own station is within operational range of said SLS signals, second receiver means for receiving reply messages transmitted by any transponder-equipped Other station in response to said interrogation signals during a predetermined period following reception of said interrogation signals by said first receiver and initiated by the P3 pulses of each said received interrogation signal, and means for producing at Own station from said received interrogation signals and said received reply messages from Other a differential time of arrival value for each of said Other stations with respect to each said SSR, apparatus for determining differential time of arrival values for each of said Other stations in the event P1-P3 pulse pairs are not received, but P2 pulses are received by said first receiver means, said apparatus comprising:

means for initiating said predetermined period by each received P2 pulse, and means for determining from the time relationship between each received P2 pulse and each received reply message elicited by an associated interrogation signal, the identity and altitude of each said Other station and differential time of arrival data for each of said identified Other stations with respect to each said SSR.

12. Apparatus as set forth in claim 11, wherein said last-mentioned means comprises:

means for storing as entries in respective running accounts the time of arrival, relative to each received P2 pulse, of successive identity and altitude reply messages representative of a predetermined number of interrogation repetition periods, means for selecting from said stored time of arrival values those TOA values that differ by 13 microseconds and producing short and long TOAs, means for subtracting 19 microseconds from said long TOAs and 6 microseconds from said short TOAs to establish a common TOA value representative of what the TOA value would have been had P1-P3 pulse pairs been received; and means for decoding said long TOAs to obtain altitude codes and for decoding said short TOAs to obtain identity codes.

* * * * *

UNITED STATES PATENT AND TRADEMARK OFFICE
CERTIFICATE OF CORRECTION

PATENT NO. : 5,196,856
DATED : March 23, 1993
INVENTOR(S) : Litchford et al.

It is certified that error appears in the above-identified patent and that said Letters Patent is hereby corrected as shown below:

Col. 1, line 17, "applicants, U.S." should read --applicants' U.S.--. Col. 7, line 46, "side" should read --side lobe of the main beam for suppression of a transponder.--. Col. 13, line 36, "The" should read --The "listen-in" gate 70 assures that for a period of 200 μsec.--. Col. 17, line 31,"(cT1)2" should read --(cT1)/2--; line 40, "(cT2)2" should read --(cT2)/2--. Col. 19, line 35, "(d) to determine ..." should immediately follow "step" in line 34. Col. 20, line 11, "stations, reply" should read --stations' reply--.

Signed and Sealed this

Seventh Day of December, 1993

Attest:

BRUCE LEHMAN

Attesting Officer

Commissioner of Patents and Trademarks